(12) United States Patent
Liao et al.

(10) Patent No.: US 7,440,269 B2
(45) Date of Patent: Oct. 21, 2008

(54) NOTEBOOK COMPUTER WITH AN INTEGRATED COSMETIC SET

(75) Inventors: Po-Yu Liao, Taipei County (TW); You-Wei Teng, Taipei County (TW); Chung-Yuo Wu, Taipei (TW); Yu-Chung Lin, Nantou County (TW)

(73) Assignee: Micro-Star Int'l Co., Ltd., Jung-He, Taipei Hsien (TW)

( * ) Notice: Subject to any disclaimer, the term of this patent is extended or adjusted under 35 U.S.C. 154(b) by 265 days.

(21) Appl. No.: 11/550,423

(22) Filed: Oct. 18, 2006

(65) Prior Publication Data
US 2007/0097615 A1    May 3, 2007

(30) Foreign Application Priority Data
Oct. 28, 2005    (TW) .............................. 94218720 U

(51) Int. Cl.
*G06F 1/16* (2006.01)

(52) U.S. Cl. ........................ 361/683; 132/218; 455/347

(58) Field of Classification Search ................. 361/679, 361/683; 132/218, 287
See application file for complete search history.

(56) References Cited

U.S. PATENT DOCUMENTS

| | | | | |
|---|---|---|---|---|
| 5,428,355 A * | 6/1995 | Jondrow et al. | ................ | 341/20 |
| 5,880,928 A * | 3/1999 | Ma | ............................. | 361/683 |
| 6,262,716 B1 * | 7/2001 | Raasch | ........................ | 345/168 |
| 6,311,077 B1 * | 10/2001 | Bien | ........................... | 455/566 |
| 6,697,251 B1 * | 2/2004 | Aisenberg | .................... | 361/683 |
| 6,768,634 B2 * | 7/2004 | Kim | ............................ | 361/679 |
| 6,788,919 B2 * | 9/2004 | Watanabe | .................. | 455/90.3 |
| 6,798,647 B2 * | 9/2004 | Dickie | ......................... | 361/683 |
| 7,340,238 B2 * | 3/2008 | Napier-Clark | .............. | 455/347 |
| 2005/0172981 A1 * | 8/2005 | Byun | ......................... | 132/287 |

\* cited by examiner

*Primary Examiner*—Lisa Lea-Edmonds
(74) *Attorney, Agent, or Firm*—Winston Hsu

(57) ABSTRACT

A notebook computer is suitable for a user who wears make-up. In addition to the computing power, a cosmetic set is integrated into the notebook computer. Thus the user can carry the notebook computer with the cosmetic set together as one single item instead of carrying two separate items.

13 Claims, 4 Drawing Sheets

NOTEBOOK COMPUTER WITH AN INTEGRATED COSMETIC SET

BACKGROUND OF THE INVENTION

1. Field of the Invention

The present invention relates to a notebook computer, and more particularly, to a notebook computer with an integrated cosmetic set.

2. Description of the Prior Art

Please refer to FIG. 1. FIG. 1 is a perspective view of a prior art notebook computer 10. Notebook computers are widely used by business travelers and sales representatives because these groups of people often have to travel to different places to attend meetings and make business deals. Further a lot of business travelers are female. They often carry a cosmetic set with them when traveling because some people believe that women wearing make-up tend to enhance their confidence and improve their appearance. Further, one day's work may require a lady to fix her make-up a few times. Therefore some women will carry a cosmetic set with them wherever they go. The cosmetic set may include a lipstick, foundation, eye shadow, mascara, eyeliner, face powder, etc. Because of all these items, a woman may have to prepare an additional cosmetic pack.

However, a business traveler often has to carry a lot of information with them. It will become a great burden for a female business traveler to carry an extra cosmetic pack. Moreover before a lady meets her client, she is likely to check her appearance again including checking on her make-up. At this time, if she is not completely satisfied with her make-up, she will have to search her cosmetic pack again to fix her appearance. Therefore the cosmetic pack becomes inseparable from the lady.

SUMMARY OF THE INVENTION

According to the present invention, a notebook computer is composed of an operation portion and a display portion. The notebook computer comprises a first slot formed at one side of the operation portion, a cosmetic set capable of being pushed into the first slot and pulled out from the first slot, a second slot formed at one side of the display portion, and a mirror capable of being pushed into the second slot and pulled out from the second slot by rotating with respect to a pivot.

According to the present invention, another notebook computer is composed of an operation portion and a display portion, characterized in that a storage portion is formed next to an operation surface of the operation portion for accommodating a cosmetic set.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
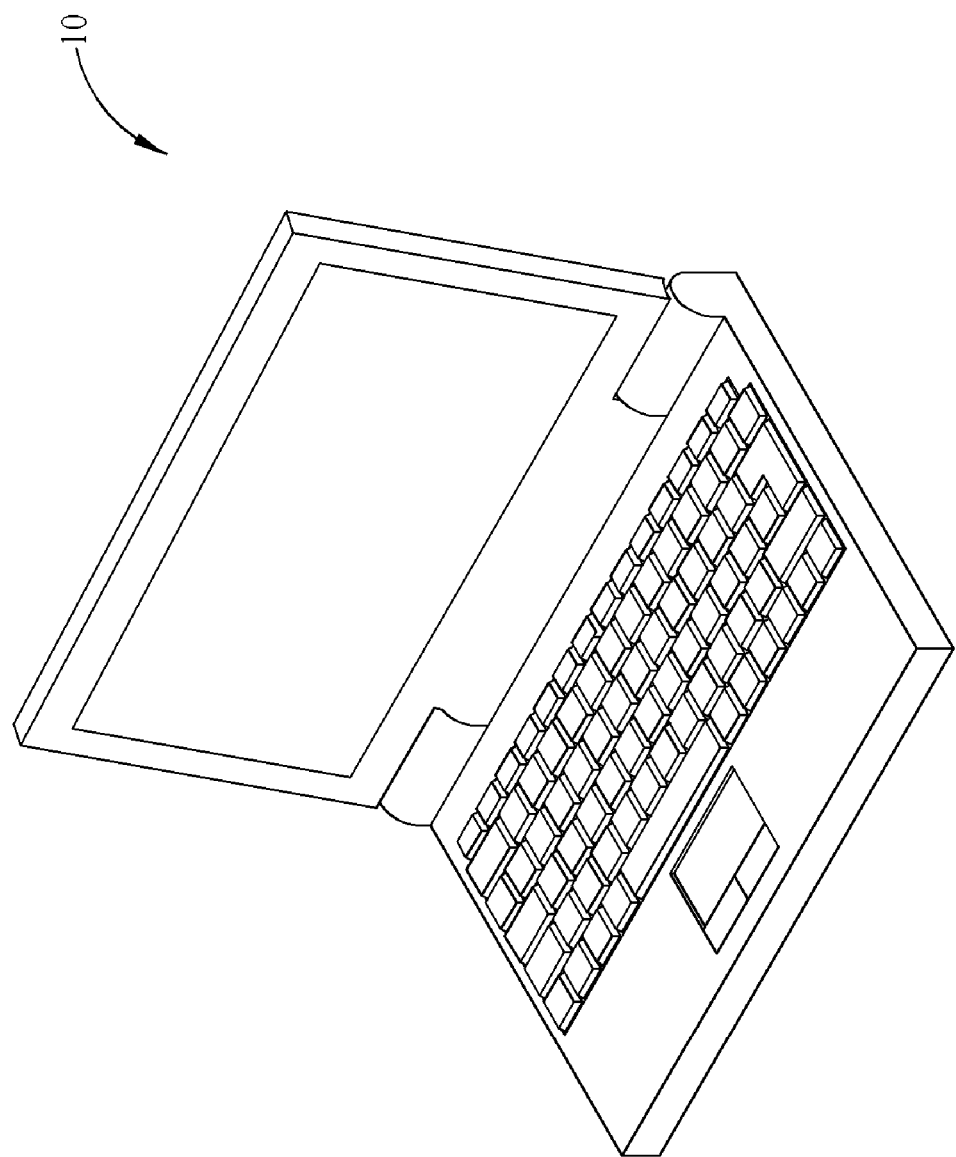
FIG. 1 is a perspective view of a prior art notebook computer.
Figure 2:
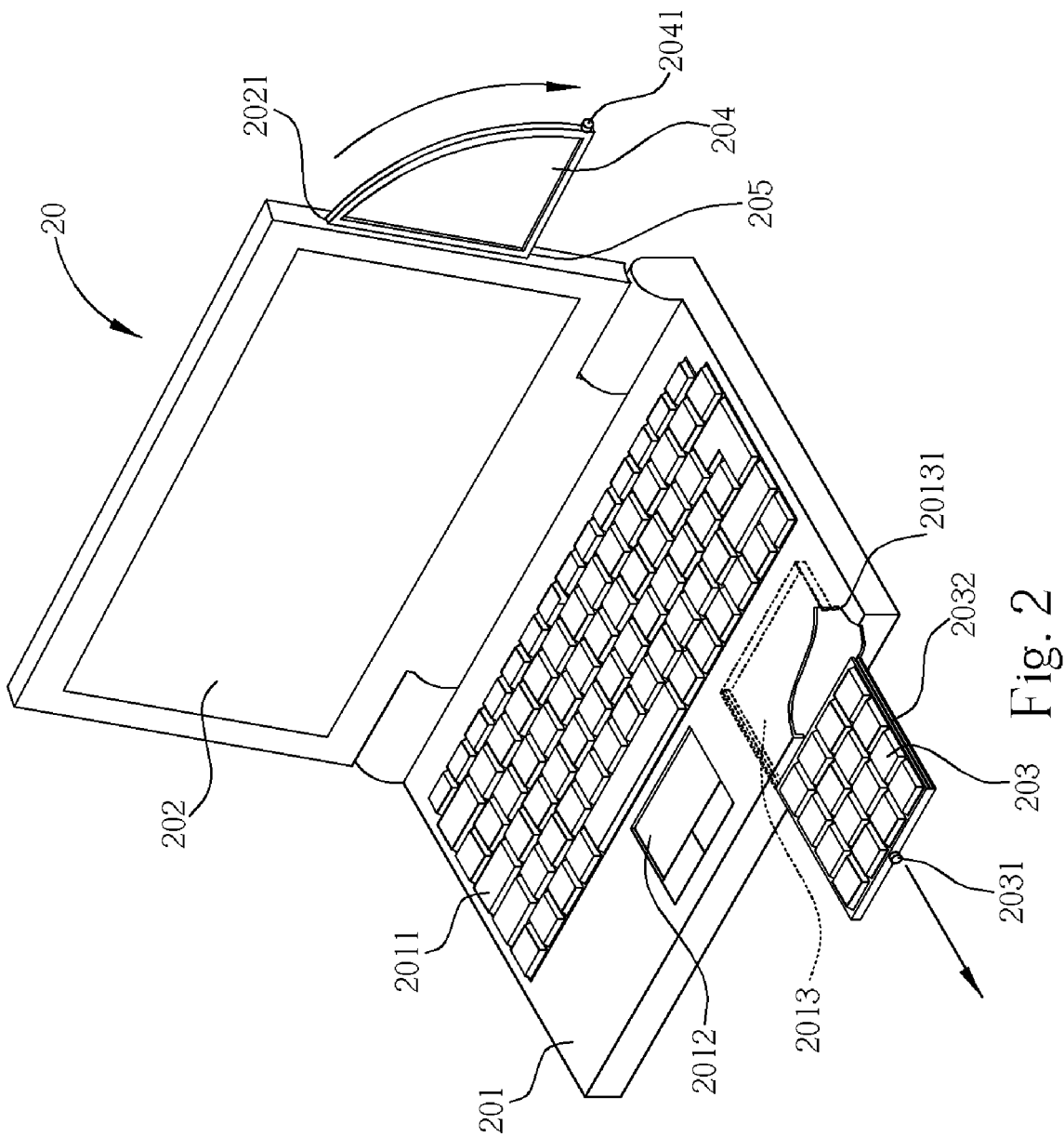
FIG. 2 is a perspective view of a notebook computer according to the first embodiment of the present invention.

Please refer to FIG. 2. FIG. 2 is a perspective view of a notebook computer 20 according to the first embodiment of the present invention. The notebook computer 20 is composed of an operation portion 201 and a display portion 202. The operation portion 201 is provided with at least a key operation portion 2011 and a cursor operation portion 2012. A first slot 2013 is formed at one side of the operation portion 201 for disposing a cosmetic set 203. In this embodiment, the cosmetic set 203 includes a plurality of cosmetic items such as a lipstick, foundation, eye shadow, mascara, eyeliner, face powder, etc. Further the cosmetic set 203 can be pulled out from the first slot 2013 when a user needs to use a cosmetic item and can be pushed into the first slot 2013 after the user finishes using the cosmetic item. The cosmetic set 203 has a side with an elongated slot 2032. The first slot 2013 has a corresponding protruding edge 20131 for engaging with the elongated slot 2032 to avoid vibrations of the cosmetic set 203. The cosmetic set 203 has a front side with a protruded knob 2031. The knob 2031 allows a user to push the cosmetic set 203 into the first slot 2013 after using the cosmetic set 203. Further an elastic hook and an elastic element are installed inside the first slot 2013. After the cosmetic set 203 is pushed into the first slot 2013, the elastic hook hooks the cosmetic set 203, and then the cosmetic set 203 is positioned against the elastic element. When the user pushes the knob 2031, the elastic hook will unhook the cosmetic set 203, and the elastic element will push the cosmetic set 203 away from the first slot 2013.

Please refer to FIG. 2 again, a second slot 2021 is formed at one side of the display portion 202. The second slot 2021 is used to accommodate a fan-shaped mirror 204 which can be pushed into the second slot 2021 and pulled out from the second slot 2021 by rotating with respect to a pivot 205. Therefore, when a user fixes her make-up, the user does not need to use another mirror. Further, the mirror 204 has an end with a knob 2041 for the user to move in or move out the mirror 204. Moreover, an elastic hook is installed inside the second slot 2021 for hooking the mirror 204 after the mirror 204 is pushed into the second slot 2021, and an elastic element is also installed inside the second slot 2021 for pushing against the mirror 204 after the mirror 204 is pushed into the second slot 2021 and pushing the mirror 204 away from the second slot 2021 after the mirror 204 is unhooked from the elastic hook.

Figure 3:
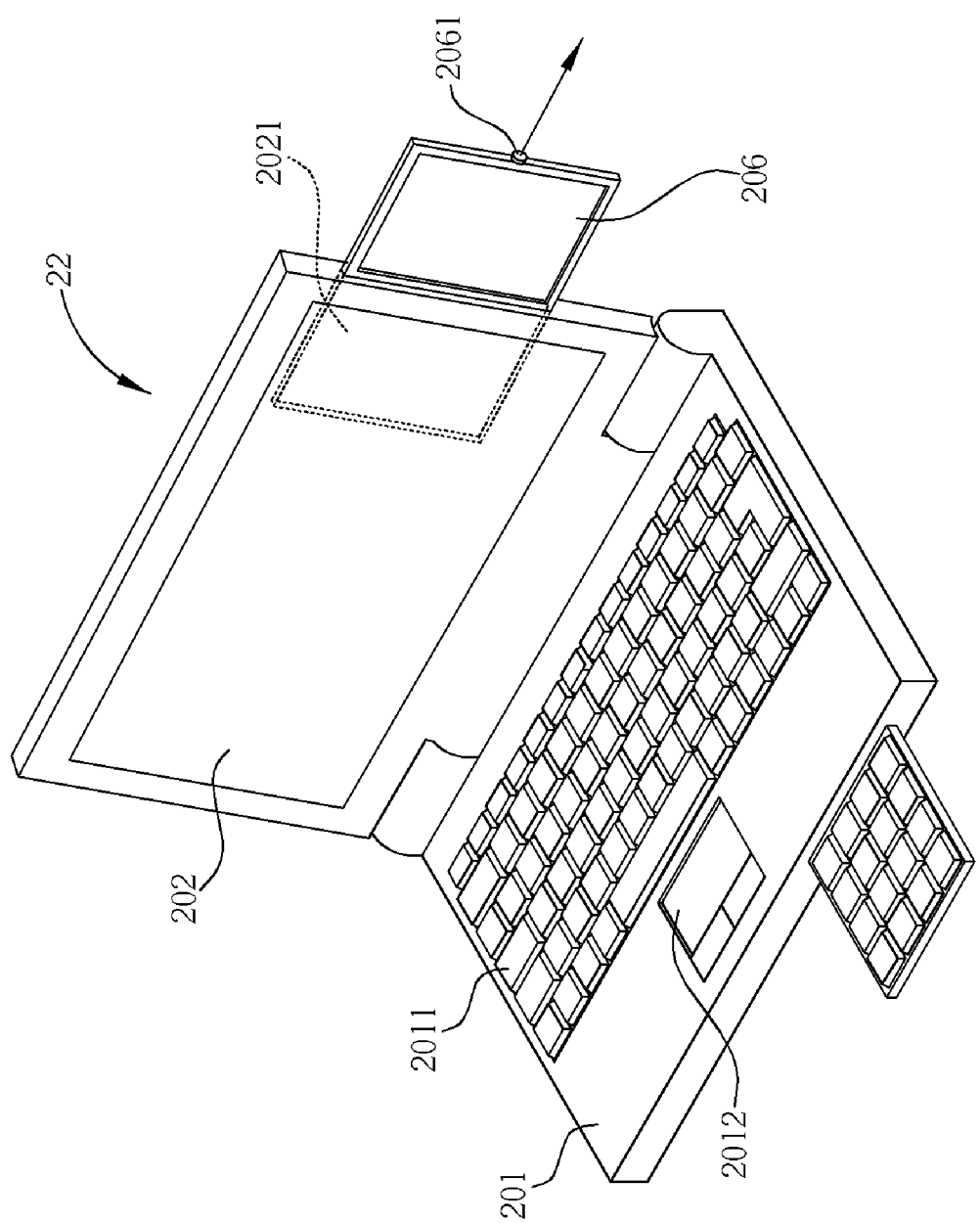
FIG. 3 is a perspective view of a notebook computer according to the second embodiment of the present invention.

Please refer to FIG. 3. FIG. 3 is a perspective view of a notebook computer 22 according to the second embodiment of the present invention. The difference between the notebook computer 20 and the notebook computer 22 is in the design of the mirror. The mirror 206 of the notebook computer 22 is rectangular-shaped. An edge of the mirror 206 has a knob 2061 for horizontally pulling the mirror 206 out of the second slot 2021 or pushing the mirror 206 into the second slot 2021. Moreover, an elastic hook is installed inside the second slot 2021 for hooking the mirror 206 after the mirror 206 is pushed into the second slot 2021, and an elastic element is also installed inside the second slot 2021 for pushing against the mirror 206 after the mirror 206 is pushed into the second slot 2021 and pushing the mirror 206 away from the second slot 2021 after the mirror 206 is unhooked from the elastic hook.

Figure 4:
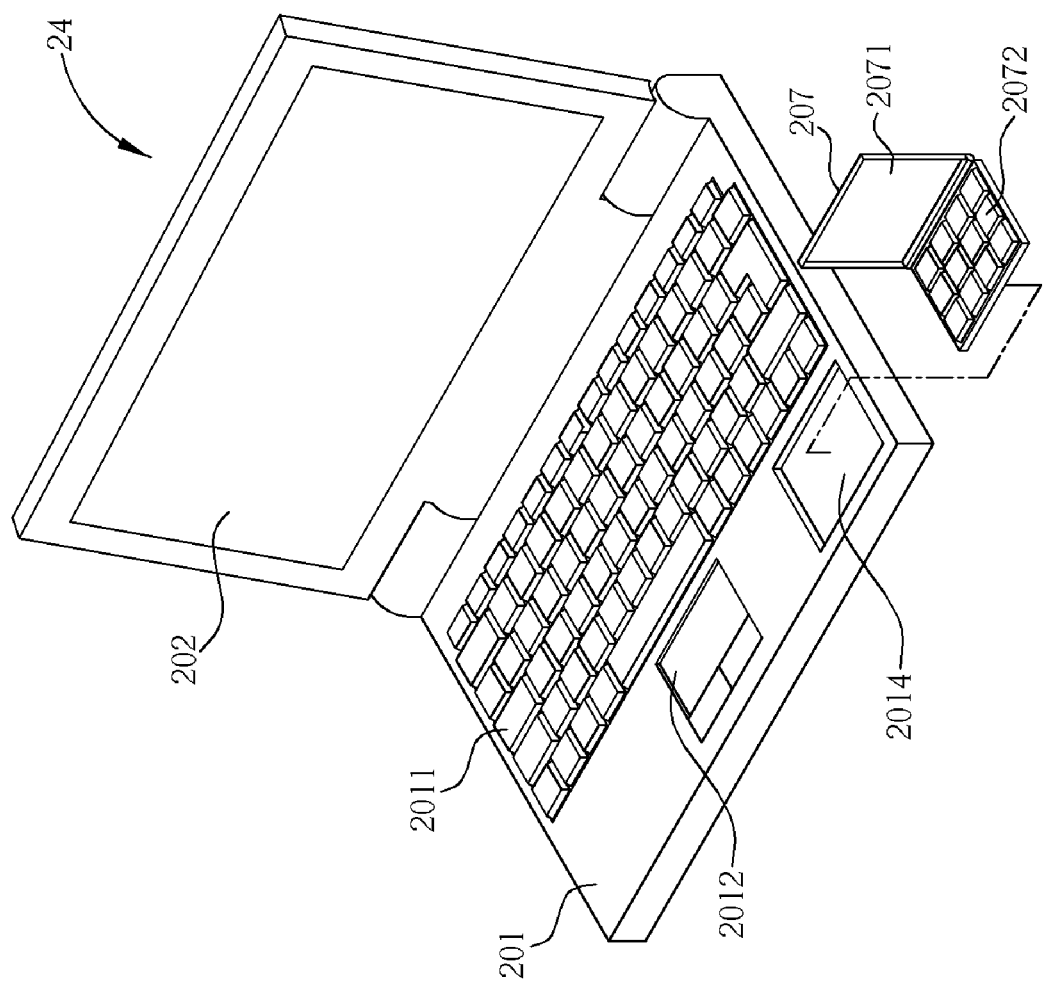
FIG. 4 is a perspective view of a notebook computer according to the third embodiment of the present invention.

Please refer to FIG. 4. FIG. 4 is a perspective view of a notebook computer 24 according to the third embodiment of the present invention. As shown in FIG. 4, a cosmetic set 207 is detachable from the notebook computer 24. Thus, when not using the cosmetic set 207, the cosmetic set 207 can be stored in a storage portion 2014 of the notebook computer 24. When using the cosmetic set 207, a user can choose to remove the cosmetic set 207 from the notebook computer 24. As shown in FIG. 4, the storage portion 2014 faces upward, and is formed on a surface of the operation portion 201 of the notebook computer 24. However, the storage portion 2014 is not constrained to that design. The storage portion 2014 can be formed at other parts of the notebook computer 204 such as at a side of the operation portion 201. Further the cosmetic set 207 can comprise more than one cosmetic item 2072, and a mirror 2071. Thus the design of the cosmetic set 207 can be varied according to a user's demand.

The present invention inherently carries out at least following advantages:

(1) The notebook computer is integrated with the cosmetic set, thus the user does not need to spare extra space to accommodate the cosmetic set;

(2) The notebook computer is integrated with the cosmetic set, thus the cosmetic set becomes easily portable.

(3) The notebook computer is integrated with the mirror, making wearing make-up convenient and feasible.

In conclusion, a cosmetic set is integrated into a notebook computer in the present invention. Therefore, the user can carry the cosmetic set with great ease.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A notebook computer composed of an operation portion and a display portion, the notebook computer comprising:
   a first slot formed at one side of the operation portion;
   a cosmetic set capable of being pushed into the first slot and pulled out from the first slot;
   a second slot formed at one side of the display portion; and
   a mirror capable of being pushed into the second slot and pulled out from the second slot by rotating with respect to a pivot.

2. The notebook computer of claim 1 wherein the cosmetic set has a side with an elongated slot, the first slot having a corresponding protruding edge for engaging with the elongated slot.

3. The notebook computer of claim 1 further comprising an elastic hook inside the first slot for hooking the cosmetic set after the cosmetic set is pushed into the first slot.

4. The notebook computer of claim 3 wherein the cosmetic set has a side with a knob.

5. The notebook computer of claim 3 further comprising an elastic element inside the first slot for pushing against the cosmetic set after the cosmetic set is pushed into the first slot and pushing the cosmetic set away from the first slot after the cosmetic set is unhooked from the elastic hook.

6. The notebook computer of claim 1 wherein the mirror is fan shaped.

7. The notebook computer of claim 6 wherein the mirror has an end with a knob.

8. The notebook computer of claim 1 wherein the mirror is of a rectangular shape.

9. The notebook computer of claim 8 wherein the mirror has a side with a knob.

10. The notebook computer of claim 1 further comprising an elastic hook inside the second slot for hooking the mirror after the mirror is pushed into the second slot.

11. The notebook computer of claim 10 further comprising an elastic element inside the second slot for pushing against the mirror after the mirror is pushed into the second slot and pushing the mirror away from the second slot after the mirror is unhooked from the elastic hook.

12. A notebook computer composed of an operation portion and a display portion,
   characterized in that a storage portion is formed next to an operation surface of the operation portion for accommodating a cosmetic set.

13. The notebook computer of claim 12 wherein the storage portion is formed at a side surface of the operation portion.

* * * * *